US012668113B2

(12) United States Patent (10) Patent No.: US 12,668,113 B2

Beange et al. (45) Date of Patent: Jun. 30, 2026

(54) ENERGY STORAGE SYSTEM FOR VEHICLE AND MOUNTING SYSTEM FOR SAME

(71) Applicant: Joy Global Underground Mining LLC, Warrendale, PA (US)

(72) Inventors: Craig Beange, Lively (CA); Daniel Black, Whitefish (CA)

(73) Assignee: Joy Global Underground Mining LLC, Warrendale, PA (US)

( * ) Notice: Subject to any disclaimer, the term of this patent is extended or adjusted under 35 U.S.C. 154(b) by 207 days.

(21) Appl. No.: 18/506,753

(22) Filed: Nov. 10, 2023

(65) Prior Publication Data

US 2024/0157776 A1 May 16, 2024

Related U.S. Application Data

(60) Provisional application No. 63/424,727, filed on Nov. 11, 2022, provisional application No. 63/426,662, filed on Nov. 18, 2022.

(51) Int. Cl.
B60K 1/04 (2019.01)
F15B 15/00 (2006.01)
(Continued)

(52) U.S. Cl.
CPC ................ B60K 1/04 (2013.01); F15B 15/00 (2013.01); H01M 50/249 (2021.01);
(Continued)

(58) Field of Classification Search
CPC ............ B60K 1/04; B60K 2001/0416; H01M 50/249; H01M 50/262; H01M 2220/20; F15B 15/00; B60L 50/66; B60L 2200/40
See application file for complete search history.

(56) References Cited

U.S. PATENT DOCUMENTS

| | | | |
|---|---|---|---|
| 3,683,255 A | 8/1972 | Schroeder |
| 4,265,587 A | 5/1981 | Clark |

(Continued)

FOREIGN PATENT DOCUMENTS

| | | |
|---|---|---|
| CN | 112324491 A | 5/2021 |
| CN | 115288217 A | 11/2022 |
| WO | 9954158 A1 | 10/1999 |

OTHER PUBLICATIONS

International Search Report and Written Opinion for Application No. PCT/US23/79394, dated Apr. 4, 2024 10 pages.

(Continued)

*Primary Examiner* — Edwin A Young

(74) *Attorney, Agent, or Firm* — Husch Blackwell LLP

(57) ABSTRACT

An energy storage system is selectively mountable to a vehicle and includes a frame, a battery supported on the frame, and a frame mounting interface. The frame includes a base surface and a mounting surface. At least a portion of the base surface is positioned in a plane oriented at an acute angle relative to a direction that is perpendicular to the mounting surface. The base surface may rest on a ground surface while the frame is not mounted to the vehicle. The frame mounting interface is positioned adjacent the frame mounting surface. The frame mounting interface may engage a chassis mounting interface positioned on a chassis of the vehicle, and the engagement of the base surface with the ground surface causes the frame mounting interface to be positioned in an orientation that may facilitate engagement with the chassis mounting interface while the frame is not mounted on the vehicle.

19 Claims, 15 Drawing Sheets

(51) Int. Cl.
    *H01M 50/249*        (2021.01)
    *H01M 50/262*        (2021.01)
    *B60L 50/60*         (2019.01)

(52) U.S. Cl.
    CPC ... *H01M 50/262* (2021.01); *B60K 2001/0416*
        (2013.01); *B60L 50/66* (2019.02); *B60L*
        *2200/40* (2013.01); *H01M 2220/20* (2013.01)

(56)              References Cited

U.S. PATENT DOCUMENTS

| | | |
|---|---|---|
| 4,397,365 A | 8/1983 | Harbe et al. |
| 4,422,814 A | 12/1983 | Borders |
| 5,003,236 A | 3/1991 | Harless |
| 5,112,113 A | 5/1992 | Wagner et al. |
| 5,156,230 A | 10/1992 | Washburn |
| 5,163,537 A | 11/1992 | Radev |
| 5,238,298 A | 8/1993 | Wagner et al. |
| 5,297,921 A | 3/1994 | Springer et al. |
| 5,542,488 A | 8/1996 | Nixon |
| 5,549,443 A | 8/1996 | Hammerslag |
| 5,612,606 A | 3/1997 | Guimarin et al. |
| 5,760,569 A | 6/1998 | Chase, Jr. |
| 5,855,467 A | 1/1999 | Clonch et al. |
| 5,951,229 A | 9/1999 | Hammerslag |
| 5,998,963 A | 12/1999 | Aarseth |
| 6,113,342 A | 9/2000 | Smith et al. |
| 6,994,560 B2 | 2/2006 | Kohchi |
| 7,201,384 B2 | 4/2007 | Chaney |
| 7,520,355 B2 | 4/2009 | Chaney |
| 8,146,694 B2 | 4/2012 | Hamidi |
| 8,164,300 B2 | 4/2012 | Agassi et al. |
| 8,516,687 B2 | 8/2013 | Hozumi et al. |
| 8,963,495 B2 | 2/2015 | Park et al. |
| 9,177,306 B2 | 11/2015 | Penilla et al. |
| 9,352,728 B2 | 5/2016 | Corfitsen |
| 9,358,895 B2 | 6/2016 | Avganim |
| 9,932,019 B2 | 4/2018 | Hassounah |
| 9,937,818 B2 | 4/2018 | Newman |
| 9,944,140 B2 | 4/2018 | Springer |
| 9,969,283 B2 * | 5/2018 | Deahl ..................... B60L 53/80 |
| 10,044,012 B2 | 8/2018 | Sham |
| 10,112,471 B2 | 10/2018 | Higuchi et al. |
| 10,252,632 B2 | 4/2019 | Hernandez Lopez et al. |
| 10,668,830 B2 | 6/2020 | Huff et al. |
| 10,800,266 B2 | 10/2020 | Sponheimer et al. |
| 10,833,379 B2 | 11/2020 | Scaringe et al. |
| 10,906,383 B2 | 2/2021 | Huff et al. |
| 10,926,660 B2 | 2/2021 | Hickey et al. |
| 10,974,614 B2 | 4/2021 | Huff et al. |
| 11,241,974 B2 | 2/2022 | Huff et al. |
| 11,254,224 B2 | 2/2022 | Hickey |
| 11,305,746 B2 | 4/2022 | Hickey |
| 11,367,908 B2 | 6/2022 | Rogers |
| 11,396,237 B2 | 7/2022 | Hickey et al. |
| D959,501 S | 8/2022 | Hickey et al. |
| 11,400,829 B1 | 8/2022 | Hajimiri |
| 11,414,134 B2 | 8/2022 | Timofeev et al. |
| 11,453,309 B2 | 9/2022 | Huff et al. |
| 11,456,554 B2 | 9/2022 | Springer et al. |
| 11,597,294 B2 | 3/2023 | Hickey |
| 2003/0150352 A1 | 8/2003 | Kumar |
| 2003/0205421 A1 | 11/2003 | Allen |

| | | |
|---|---|---|
| 2003/0209375 A1 | 11/2003 | Suzuki et al. |
| 2005/0100767 A1 | 5/2005 | Stolmar |
| 2006/0005737 A1 | 1/2006 | Kumar |
| 2006/0061309 A1 | 3/2006 | Rudinec |
| 2006/0273756 A1 | 12/2006 | Bowling et al. |
| 2009/0294191 A1 | 12/2009 | Sheidler et al. |
| 2010/0145717 A1 | 6/2010 | Hoeltzel |
| 2011/0113609 A1 | 5/2011 | Berdelle-Hilge et al. |
| 2011/0123309 A1 | 5/2011 | Berdelle-Hilge et al. |
| 2011/0251935 A1 | 10/2011 | German et al. |
| 2011/0301794 A1 | 12/2011 | Bastien |
| 2012/0018235 A1 | 1/2012 | O'Quinn et al. |
| 2012/0175209 A1 | 7/2012 | Mazumdar et al. |
| 2012/0217074 A1 | 8/2012 | Rudinec |
| 2012/0273285 A1 | 11/2012 | Jensen et al. |
| 2012/0298004 A1 | 11/2012 | Osara et al. |
| 2012/0304866 A1 | 12/2012 | Barrett |
| 2012/0315117 A1 | 12/2012 | Gilland et al. |
| 2013/0048382 A1 | 2/2013 | Rudinec |
| 2013/0104768 A1 | 5/2013 | Graham |
| 2013/0328393 A1 | 12/2013 | Bullock |
| 2014/0369798 A1 | 12/2014 | Escande et al. |
| 2015/0071747 A1 | 3/2015 | Deahl et al. |
| 2016/0001748 A1 | 1/2016 | Moskowitz |
| 2016/0118828 A1 | 4/2016 | Berry et al. |
| 2016/0156075 A1 | 6/2016 | Lindholm |
| 2017/0297541 A1 | 10/2017 | Droste |
| 2018/0111496 A1 | 4/2018 | Cholewa et al. |
| 2018/0264965 A1 | 9/2018 | Huff et al. |
| 2018/0334782 A1 | 11/2018 | Huff et al. |
| 2019/0061544 A1 | 2/2019 | Jansen et al. |
| 2019/0210478 A1 | 7/2019 | Mazumdar |
| 2019/0255962 A1 | 8/2019 | Vare et al. |
| 2019/0263242 A1 | 8/2019 | Huff et al. |
| 2019/0329670 A1 | 10/2019 | Kouvo et al. |
| 2020/0175551 A1 | 6/2020 | Penilla et al. |
| 2020/0254898 A1 | 8/2020 | Singhal |
| 2020/0331358 A1 | 10/2020 | Lee |
| 2020/0341439 A1 | 10/2020 | Valin |
| 2020/0353838 A1 | 11/2020 | Zhang et al. |
| 2020/0384869 A1 | 12/2020 | Hickey |
| 2021/0046814 A1 | 2/2021 | Huff et al. |
| 2021/0159567 A1 | 5/2021 | Parker et al. |
| 2021/0268930 A1 | 9/2021 | Zhang et al. |
| 2022/0032796 A1 | 2/2022 | Salter et al. |
| 2022/0097535 A1 | 3/2022 | Hickey et al. |
| 2022/0097554 A1 | 3/2022 | Hickey |
| 2022/0111753 A1 | 4/2022 | Zhang et al. |
| 2022/0242249 A1 | 8/2022 | Verho et al. |
| 2022/0348107 A1 | 11/2022 | Hajimiri |
| 2023/0069338 A1 | 3/2023 | Huang et al. |
| 2023/0070279 A1 | 3/2023 | Wheeler et al. |

OTHER PUBLICATIONS

International Search Report and Written Opinion for Application
No. PCT/US23/79416, dated Apr. 4, 2024, 12 pages.
Swedish Office Action for Application No. 2550508-2, dated Jan.
27, 2026, 10 pages.
Chilean Examiner's Report for Application No. 202501360 dated
Apr. 6, 2026, 20 pages with Statement of Relevance.
Chilean Examiner's Report for Application No. 202501357 dated
Mar. 30, 2026, 18 pages with Statement of Relevance.

* cited by examiner

ENERGY STORAGE SYSTEM FOR VEHICLE AND MOUNTING SYSTEM FOR SAME

CROSS-REFERENCE TO RELATED APPLICATIONS

This application claims the benefit of U.S. Provisional Patent Application No. 63/424,727, filed Nov. 11, 2022, and U.S. Provisional Patent Application No. 63/426,662, filed Nov. 18, 2022. The entire contents of these documents are incorporated by reference herein.

FIELD

The present disclosure relates to mining machines, and more specifically, to electric powered mining machines.

A mining machine may be powered by, for example, an energy storage system (e.g., a battery). The energy storage system may be removably coupled to a frame of the mining machine.

SUMMARY

In one independent aspect, an energy storage system is provided that is selectively mountable to a vehicle. The energy storage system includes a frame, a battery supported on the frame, and a frame mounting interface. The frame includes a base surface and a mounting surface, and at least a portion of the base surface is positioned in a plane oriented at an acute angle relative to a direction that is perpendicular to the mounting surface, the base surface configured to rest on a ground surface while the frame is not mounted to the vehicle. The frame mounting interface is positioned adjacent the frame mounting surface. The frame mounting interface is configured to engage a chassis mounting interface positioned on a chassis of the vehicle, and the engagement of the base surface with the ground surface causes the frame mounting interface to be positioned in an orientation that is configured to facilitate engagement with the chassis mounting interface while the frame is not mounted on the vehicle.

In some aspects, the acute angle is a first acute angle and the base surface includes a first portion oriented at the first acute angle, the base surface further includes a second portion oriented at a second acute angle relative to the first portion, and the base surface further includes a fulcrum between the first portion and the second portion.

In some aspects, a center of gravity of the energy storage system is positioned on a side of the fulcrum proximate the first portion, the gravity exerted on the energy storage system biasing the first portion to contact the ground surface while the frame is resting on the ground surface and causing the frame mounting interface to be oriented upwardly, away from the ground surface.

In some aspects, the second acute angle is between approximately 5 degrees and approximately 30 degrees.

In some aspects, the second acute angle is approximately 10 degrees.

In some aspects, the frame mounting interface includes a bar and a plurality of latches protruding from the mounting surface.

In some aspects, the frame mounting interface includes a recessed portion positioned on the mounting surface, and the bar extends laterally across the recessed portion.

In some aspects, the frame includes a bumper is positioned adjacent an end of the base surface, the bumper having a greater thickness than the rest of a base of the frame and the bumper including a feature to facilitate towing the energy storage system along the ground surface.

In another independent aspect, a system for coupling an energy storage system to a vehicle includes a first mounting interface and a second mounting interface. The first mounting interface is configured to be positioned on one of the energy storage system and the vehicle, and the first mounting interface includes a bar. The second mounting interface is configured to be positioned on the other of the energy storage system and the vehicle. The second mounting interface includes an arm and a latch member coupled to the arm. The arm is supported for pivoting movement, and the latch member is configured to engage the bar. Actuation of the arm causes the latch member to draw the bar and the first mounting interface against the second mounting interface.

In some aspects, the arm is pivotable in an upward direction from a first position toward a second position, wherein the latch member includes a hook oriented to engage the bar as the arm pivots in the upward direction, the pivoting movement of the arm in the upward direction drawing the first mounting interface against the second mounting interface.

In some aspects, pivoting movement of the arm in the upward direction while the hook engages the bar lifts the energy storage system from a support surface.

In some aspects, the system further includes an opening positioned on the first mounting interface or the second mounting interface; and a lug positioned on the other of the first mounting interface and the second mounting interface, the lug received in the opening as the first mounting interface is drawn against the second mounting interface.

In some aspects, the system further includes a lock actuator that is movable between a retracted position and an extended position, the lock actuator operable to selectively engage the lug, thereby securing the energy storage system against movement relative to the vehicle.

In some aspects, the lug is received into the opening in an insertion direction, the lug including an aperture extending in a direction transverse to the insertion direction, the lock actuator operable to selectively engage the aperture.

In some aspects, the opening is a first opening and the lug is a first lug, the system further comprising a second opening laterally spaced apart from the first opening and a second lug laterally spaced apart from the first lug and received in the second opening as the first mounting interface is drawn against the second mounting interface, wherein the lock actuator is operable to selectively engage both the first lug and the second lug.

In some aspects, the lock actuator is positioned between the first opening and the second opening.

In some aspects, the arm is a first arm and the latch member is a first latch member, the system further comprising a second arm laterally spaced apart from the first arm and a second latch member coupled to the second arm, the first latch member and the second latch member configured to engage the bar.

In some aspects, a crossbar extends laterally between the first arm and the second arm.

In some aspects, the first mounting interface is positioned on the energy storage system and the second mounting interface is positioned on the vehicle, wherein the first mounting interface is oriented at an acute angle relative to a base surface of the energy storage system on which the energy storage system is configured to rest while in an unmounted state.

In yet another independent aspect, a method of mounting an energy storage system to a vehicle comprises: engaging a mounting feature of the energy storage system with a latching member supported on the vehicle; pivoting the latching member in a direction away from a support surface, thereby lifting the energy storage system away from the support surface, pivoting movement of the latching member causing an end surface of the energy storage system to be drawn against an end surface of the vehicle; and actuating a locking arm to extend through at least one lug coupled to the energy storage system, thereby securing the energy storage system against movement relative to the vehicle.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Unless specified or limited otherwise, the terms "mounted," "connected," "supported," and "coupled" and variations thereof are used broadly and encompass both direct and indirect mountings, connections, supports, and couplings. Terms of degree, such as "substantially," "about," "approximately," etc. are understood by those of ordinary skill to refer to reasonable ranges outside of the given value, for example, tolerances associated with manufacturing, assembly, and use of the described embodiments.

Figure 1:
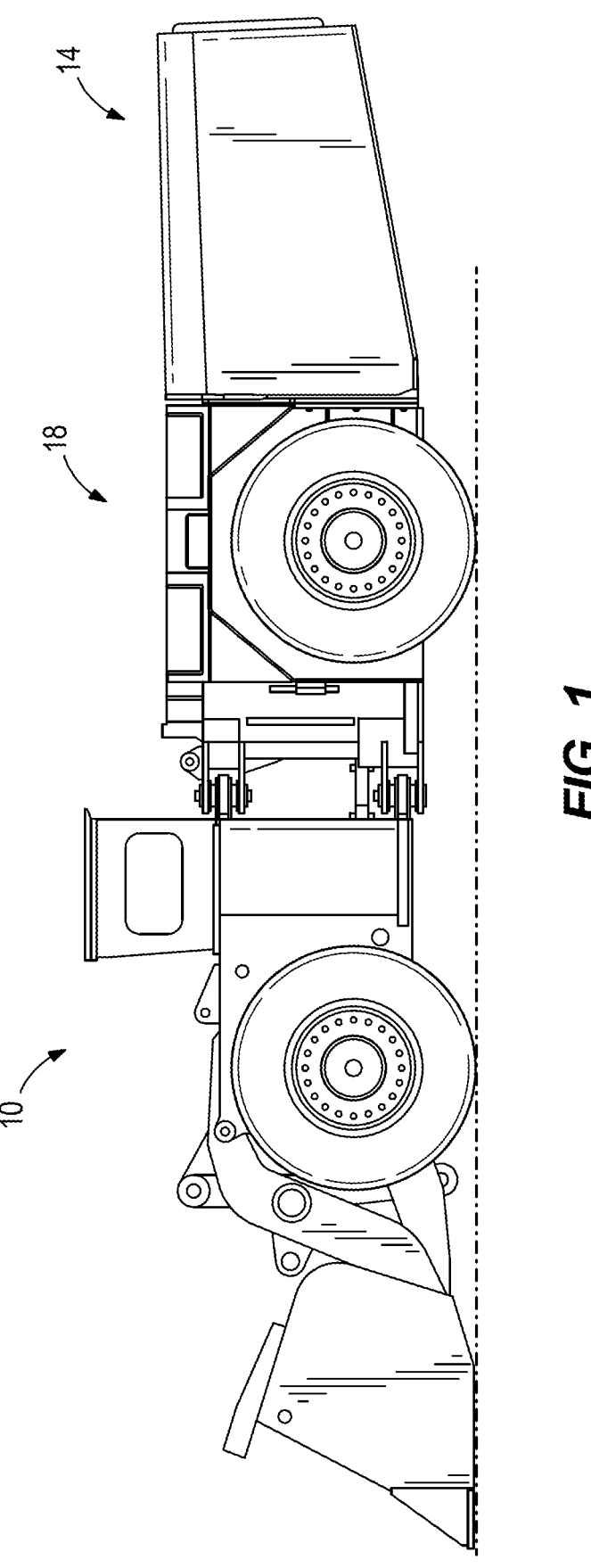
FIG. 1 is a side view of a battery mounting system for coupling an energy storage system and a chassis of an electric mining machine.

FIG. 1 illustrates a chassis 18 of a vehicle 10 (e.g., a mining machine, such as an LHD machine) including a battery mounting system for an energy storage system 14. The energy storage system 14 is removably coupled to the chassis 18 to provide power to the vehicle 10. The energy storage system 14 may be uncoupled from the chassis 18 (e.g., for charging and/or storage) and replaced with another energy storage system 14.

Figure 2:
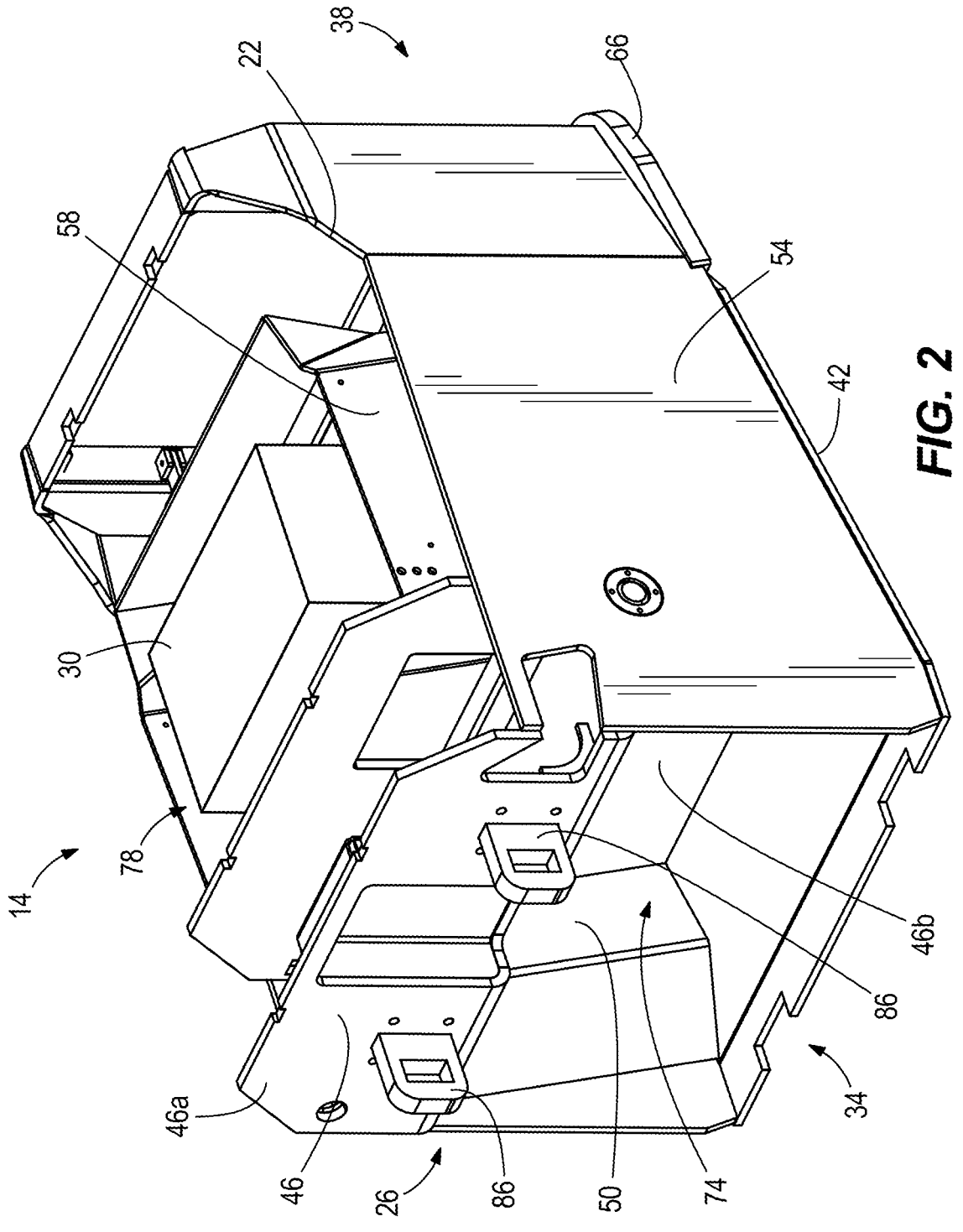
FIG. 2 is a perspective view of the energy storage system.

As shown in FIG. 2, the energy storage system 14 includes a frame 22 and a mounting interface 26. The frame 22 receives and supports a battery 30. The battery 30 is configured to supply power to the chassis 18 while the energy storage system 14 is mounted to the chassis 18. The mounting interface 26 is selectively engageable with the chassis 18 to mount the energy storage system 14 to the chassis 18.

As illustrated in FIG. 2, the frame 22 includes a first end 34, a second end 38, a base 42 extending between the first end 34 and the second end 38, a first side wall 50 that extends between the first end 34 and the second end 38, a second side wall 54 opposite the first side wall 50 and extending between the first end 34 and the second end 38, and a battery compartment 58. The battery compartment 58 is positioned between the first end 34, the first side wall 50, the second side wall 54, and the second end 38, and the battery compartment 58 includes a battery cavity 78 that within which the battery 30 is supported. In the illustrated embodiment, the first end 34 includes a mounting feature, which may include a stepped surface 46. The frame 22 receives the battery 30 in the battery compartment 58 and supports the battery 30 when the energy storage system 14 is in both an idle state (e.g., while the energy storage system is not mounted to the chassis 18) and in a mounted state (e.g., while the energy storage system 14 is coupled to the chassis 18 for movement therewith).

Figure 3:
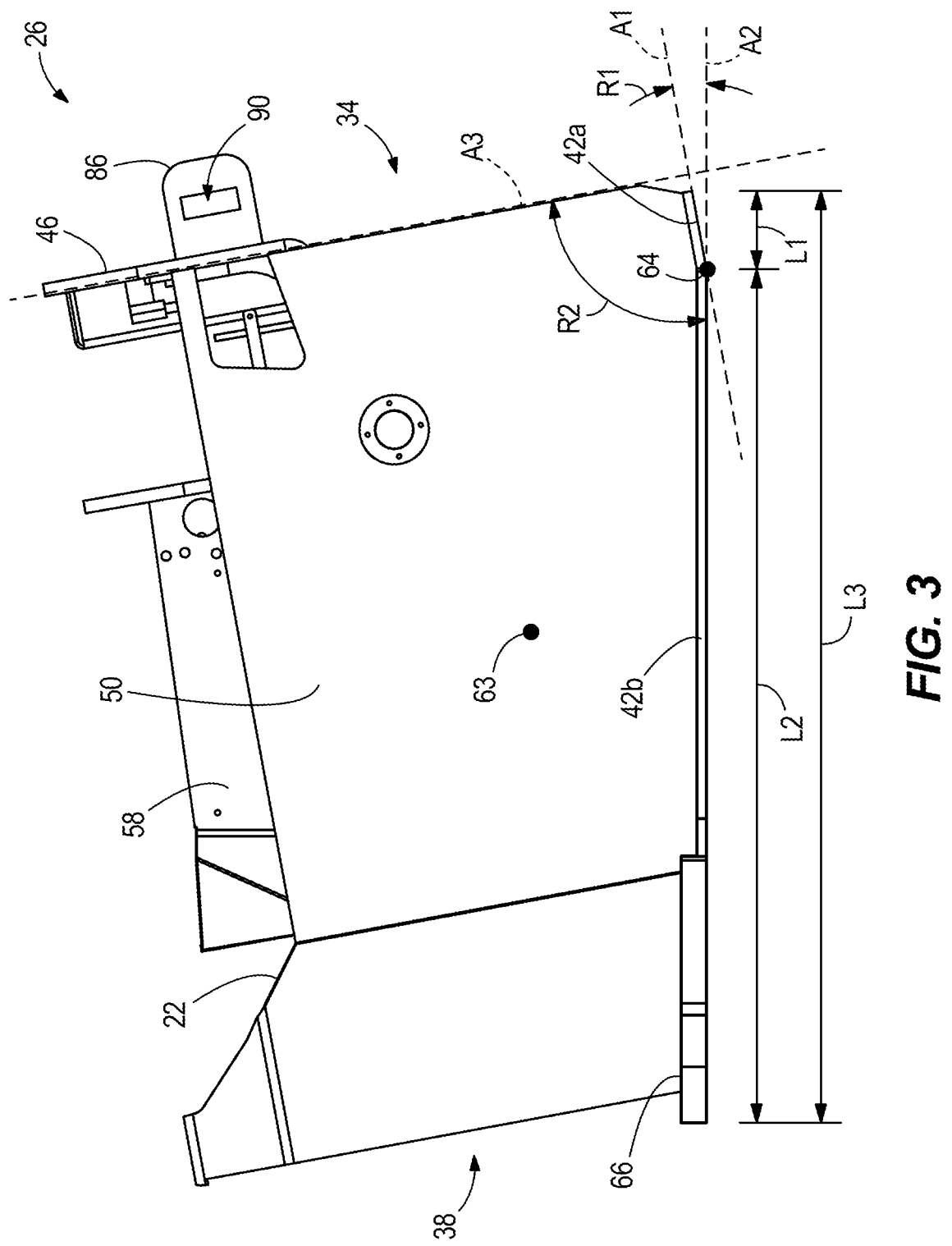
FIG. 3 is a side view of the energy storage system.

Referring now to FIG. 3, the base 42 includes a first base portion 42a and a second base portion 42b. The first base portion 42a extends from the first end 34 of the frame 22 toward the second end 38 of the frame 22. The second base portion 42b extends from the first base portion 42a to the second end 38 of the frame 22. The first base portion 42a defines a first base portion plane A1, and the second base portion 42b defines a second base portion plane A2. The first base portion plane A1 is oriented at a first angle R1 relative to the second base portion plane A2. In some embodiments, the first angle R1 is between approximately 5 degrees and approximately 30 degrees. In further embodiments, the first angle R1 is between approximately 5 degrees and approximately 20 degrees. In some embodiments, the first angle R1 is less than 15 degrees. In the illustrated embodiment, the first angle R1 is 10 degrees.

The first base portion 42a has a first length L1, the second base portion 42b has a second length L2, and the base 42 has a total length L3 that extends from the first end 34 of the frame 22 to the second end 38 of the frame 22. Although the first base portion 42a extends at an angle relative to the second base portion 42b, the first length L1 is measured along the extension direction of the second base portion plane A2 in the illustrated embodiment. The first length L1 is shorter than the second length L2.

In some embodiments, the total length L3 is equal to the sum of the first length L1 and the second length L2. In some embodiments, the first length L1 may be between approximately 5% to 50% of the total length L3, and the second length L2 may be between approximately 50% to 95% of the total length L3. In some embodiments, the first length L1 may be between approximately 5% to 25% of the total length L3, and the second length L2 may be between approximately 75% to 95% of the total length L3. In some embodiments, the first length L1 represents approximately 10% of the total length L3, and the second length L2 represents approximately 90% of the total length L3.

Figure 8:
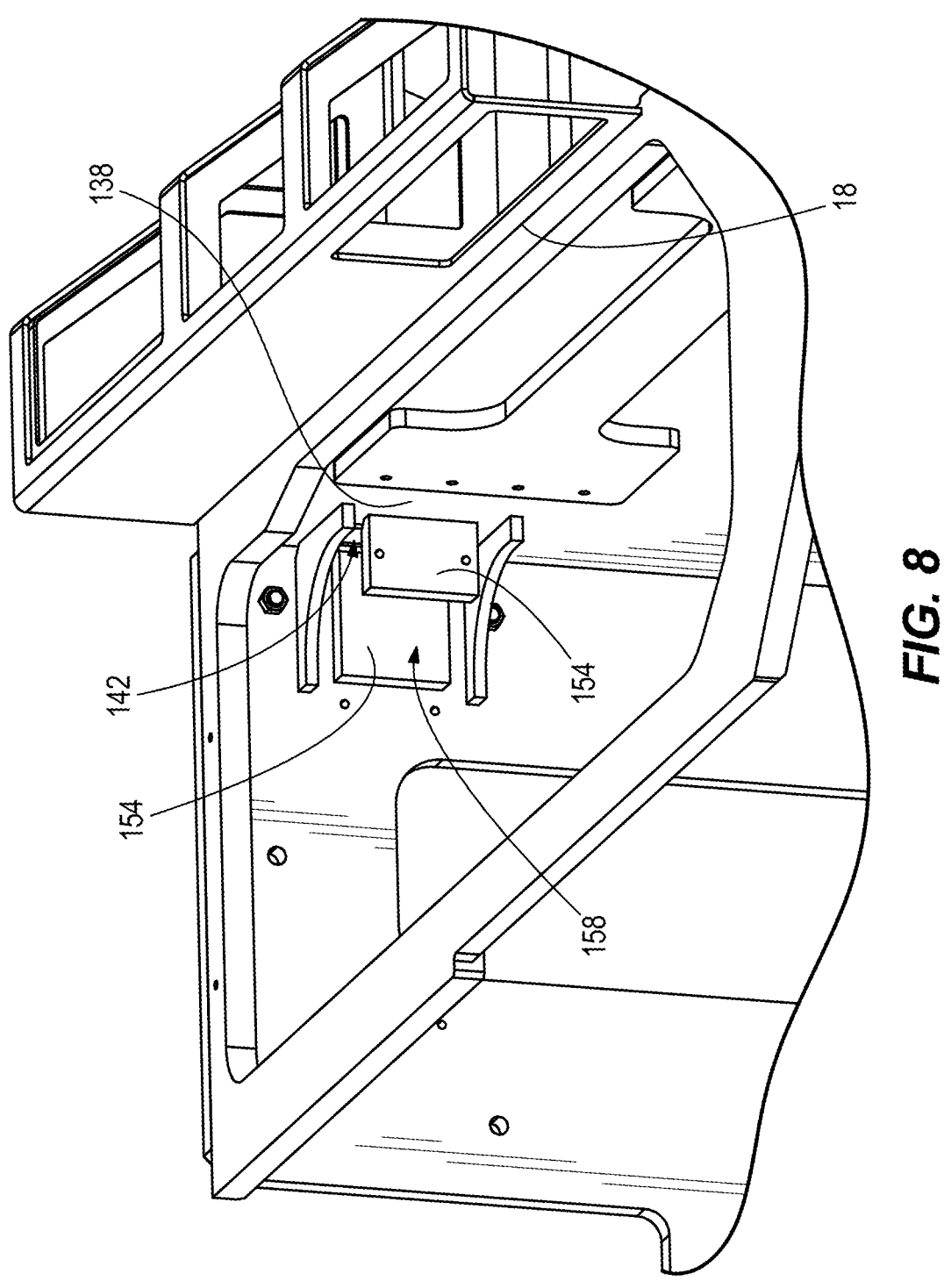
FIG. 8 is an enlarged perspective view of a portion of the chassis.

The second base portion 42b may extend along a greater portion of the base 42 than the first base portion 42a, and at least a portion of the first base portion 42a may be spaced apart from the ground surface 62 (FIG. 8). In the illustrated embodiment, a majority of the weight of the energy storage system 14 is supported by the second base portion 42b while the second base portion 42b rests on a support surface (e.g., a ground surface 62). In some embodiments, a center of gravity 63 for the energy storage system 14 is positioned substantially above the second base portion 42b. In the illustrated embodiment, the first base portion 42a and the second base portion 42b meet at a fulcrum 64 (e.g., an edge). The center of gravity 63 for the energy storage system 14 is positioned on a side of the fulcrum 64 that is proximate the second base portion 42b, and gravity biases the frame 22 to cause the second base portion 42b to rest on the ground surface 62. In some embodiments, the center of gravity 63 may be spaced apart laterally from the fulcrum 64 by a distance that is at least approximately 10% of the second length L2. In some embodiments, the center of gravity 63 may be spaced apart laterally from the fulcrum 64 by a distance that is at least approximately 25% of the second length L2. In some embodiments, the center of gravity 63 may be spaced apart laterally from the fulcrum 64 by a distance that is between approximately 25% and approximately 75% of the second length L2.

Figures 4, 5:
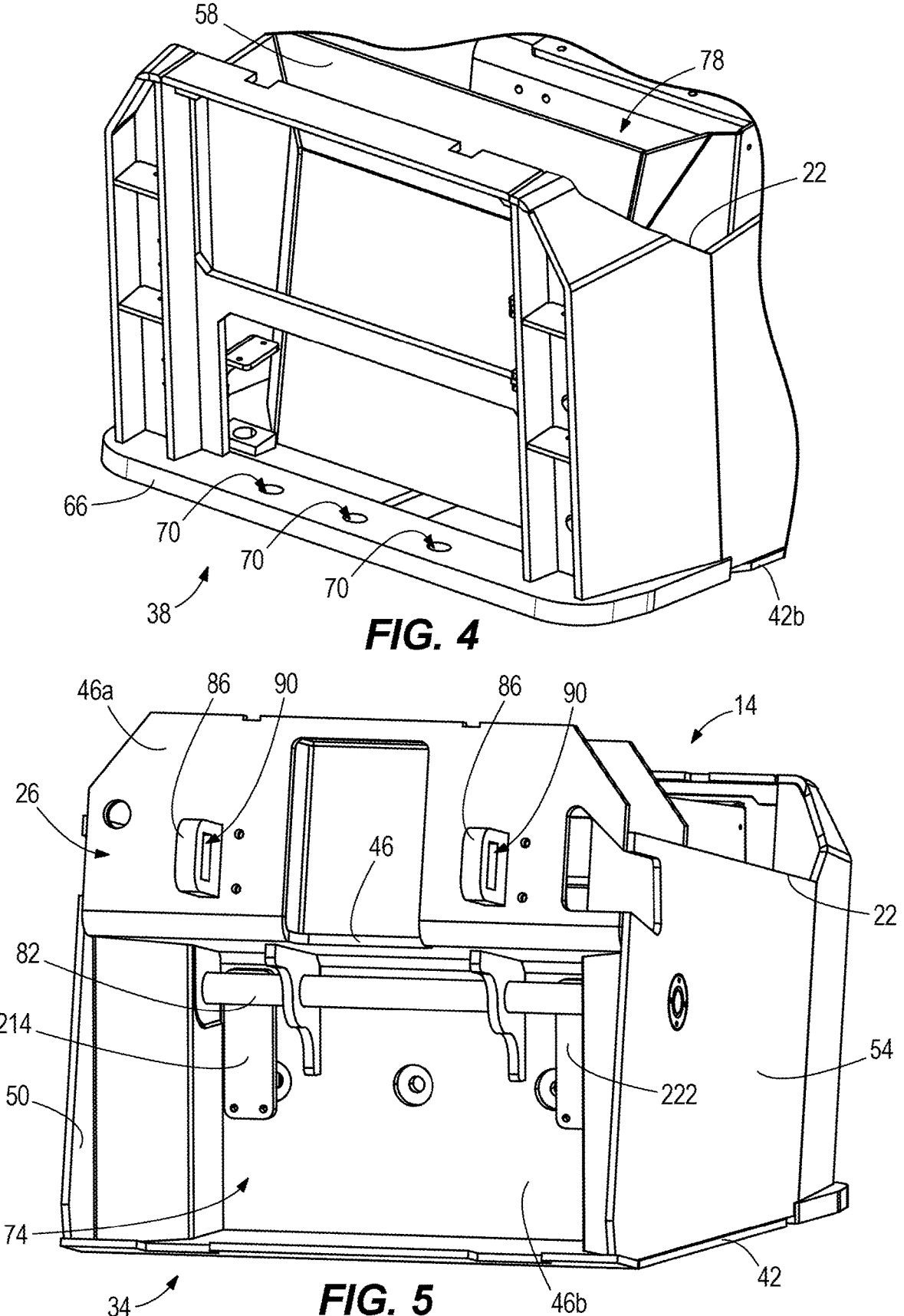
FIG. 4 is another perspective view of the energy storage system.
FIG. 5 is another perspective view of the energy storage system.

With reference to FIG. 4, the frame 22 may include a bumper 66. For example, in the illustrated embodiment, the second base portion 42b may include a bumper 66 at an end of the second base portion 42b that is opposite from the first base portion 42a (e.g., adjacent the second end 38 of the frame 22). The bumper 66 may include one or more towing apertures 70 that are configured to engage an external machine or device for towing or skidding the frame 22 from one location to another. In some embodiments, the bumper 66 has a greater thickness than the rest of the second base portion 42b to provide support for the frame 22 during a towing operation.

Referring to FIG. 5, the first end 34 of the frame 22 includes a first stepped surface including a first surface 46a and a second surface 46b that is recessed relative to the first surface 46a. The first end 34 defines a first mounting plane A3 (FIG. 3). In the illustrated embodiment, the first surface 46a defines the first mounting plane A3 (FIG. 3), and the first side wall 50 and the second side wall 54 extend from the first mounting plane A1 at the first end 34 of the frame 22 to the second end 38 of the frame 22. A mounting cavity 74 may be formed by the base 42, the first side wall 50, the second side wall 54, and the second surface 46b.

Referring again to FIG. 3, in the illustrated embodiment, the first mounting plane A3 may be oriented substantially perpendicular relative to the first base portion plane A1, and the first mounting plane A3 is oriented at a second angle R2 relative to the second base portion plane A2. In some embodiments, the first angle R1 and the second angle R2 are complementary angles (i.e., the sum of R1 and R2 is 90 degrees). In some embodiments, the second angle R2 is between 60 degrees and 85 degrees. In some embodiments, the second angle R2 is between 70 degrees and 85 degrees.

In some embodiments, the second angle R2 is at least 70 degrees. In the illustrated embodiment, the second angle R2 is approximately 80 degrees.

FIG. 5 illustrates the mounting interface 26. In the illustrated embodiment, the mounting interface 26 is positioned adjacent the first end 34 and includes a mounting bar 82 and one or more lugs 86. The mounting bar 82 may be positioned in the mounting cavity 74 and extend between the first side wall 50 and the second side wall 54. The lugs 86 protrude from the first surface 46a (e.g., in a direction away from the energy storage system 14). Each lug 86 includes a latch aperture 90. In the illustrated embodiment, the latch apertures 90 are rectangular. In other embodiments, the latch apertures 90 may have another shape (e.g., circular, square-shaped, etc.).

In some embodiments, the energy storage system 14 may include one or more wear members (e.g., a first wear plate 214 and a second wear plate 222). In the illustrated embodiment, the first wear plate 214 is similar to the second wear plate 222, and both wear plates 214, 222 are supported on the stepped surface 46 and are generally positioned adjacent the mounting bar 82. The wear plates 214, 222 are rectangularly shaped and extend from a location adjacent to the mounting bar 82 toward the base 42 of the energy storage system 14. As such, the first wear plate 214 and the second wear plate 222 are configured to engage and guide the mounting hooks 126 to the mounting bar 82.

Figure 6:
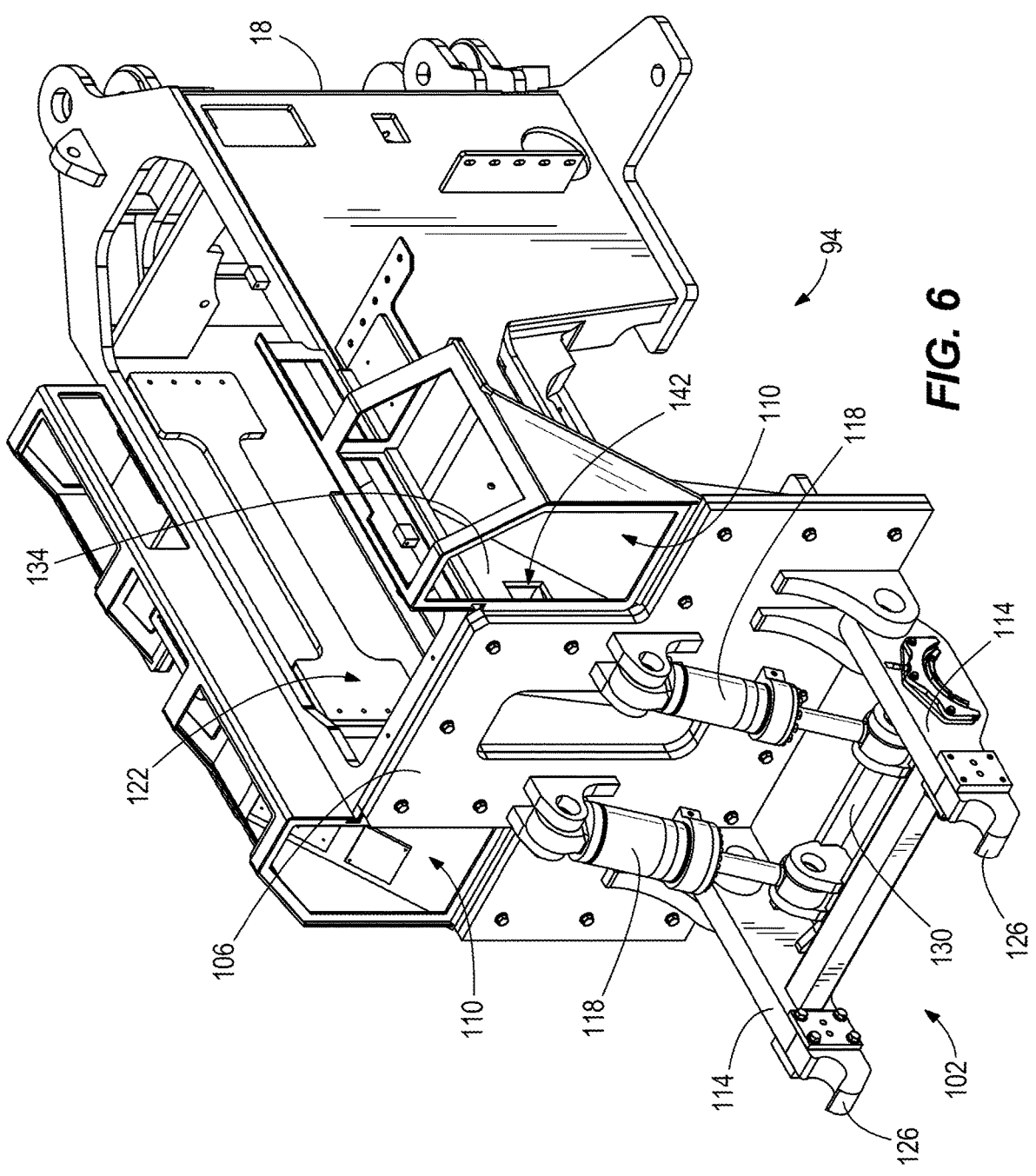
FIG. 6 is a perspective view of a portion of the chassis.

With reference to FIGS. 6 and 8, the chassis 18 includes a rear portion 94 and a forward portion 98. The rear portion 94 is configured to engage the energy storage system 14, and the forward portion 98 may include a working attachment (e.g., a bucket). In the illustrated embodiment, the rear portion 94 of the chassis 18 is pivotable relative to the forward portion 98. The rear portion 94 of the chassis 18 includes another mounting interface 102.

Figure 7:
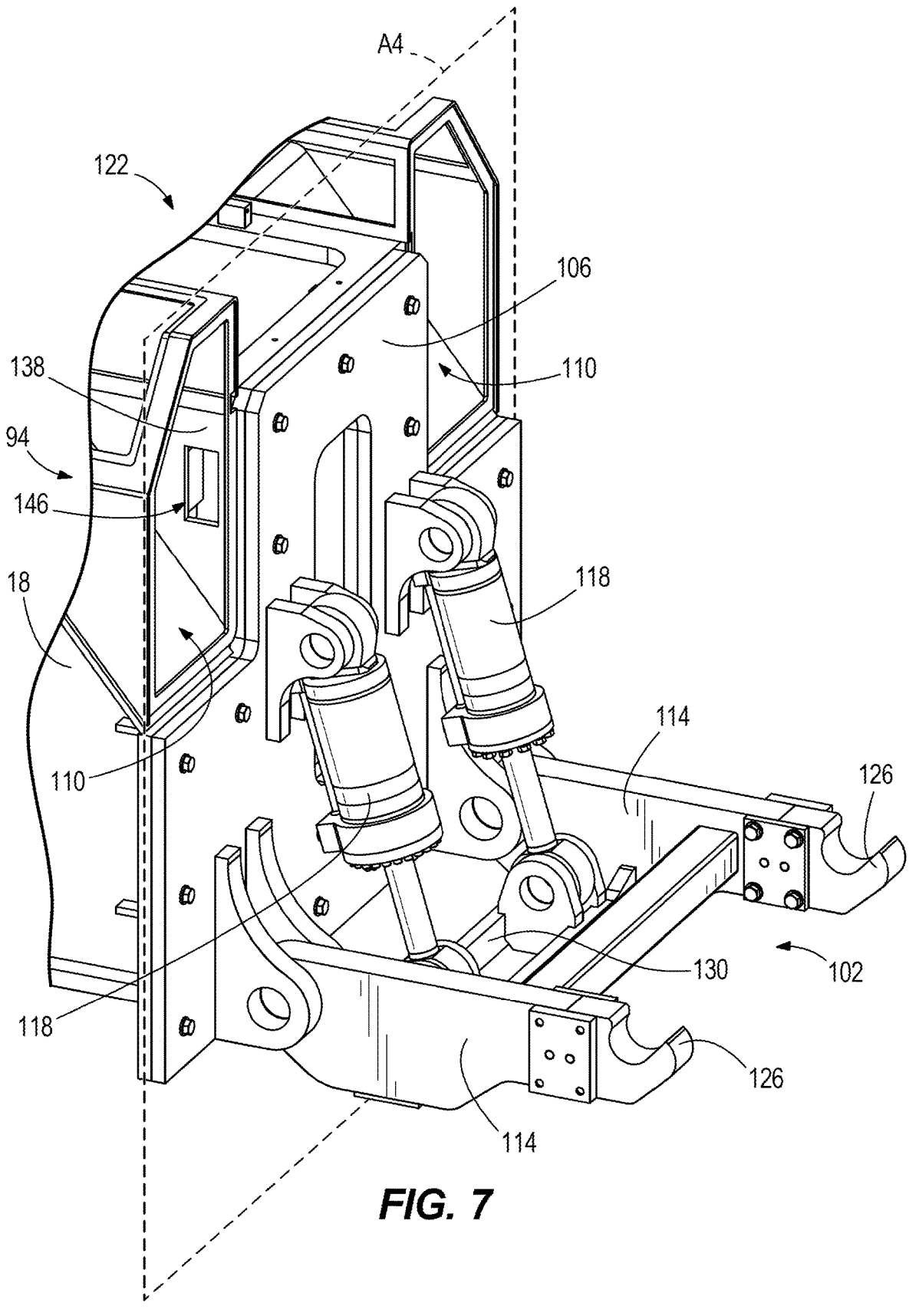
FIG. 7 is a perspective view of a portion of the chassis.

As illustrated in FIGS. 6 and 7, the mounting interface 102 is positioned adjacent a surface 106 of the chassis 18. In the illustrated embodiment, the mounting interface 102 includes latch receptacles 110, mounting arms 114, actuators (e.g., hydraulic cylinders 118), and a locking mechanism 122. The chassis surface 106 is oriented in a second mounting plane A4. When the energy storage system 14 is in the idle state, as illustrated in FIG. 8, at least a portion of the first mounting plane A3 and the second mounting plane A4 are spaced from each other. An orientation of the first mounting plane A3 relative to the second mounting plane A4 may depend on the grade or angle of the ground 62. In the illustrated embodiment, when the energy storage system 14 is in the mounted state, the first surface 46a (FIG. 5) and the chassis surface 106 contact each other, and the first mounting plane A3 and the second mounting plane A4 are substantially coincident with one another. As shown in FIGS. 6 and 7, the latch receptacles 110 include openings on the chassis surface 106 that are planarly aligned with the second mounting plane A4. The mounting arms 114 are supported on the chassis for pivoting movement. For example, each of the mounting arms 114 may include an end that is pivotably coupled to the chassis surface 106, and the actuators 118 are operable to move the mounting arms 114.

In the illustrated embodiment, the second mounting interface 102 includes two mounting arms 114 and two hydraulic cylinders 118. Each mounting arm 114 includes a latch or mounting hook 126 at an end of the mounting arm 114 that is opposite from the chassis surface 106. The mounting hooks 126 are configured to engage the mounting bar 82 of the energy storage system 14 (FIG. 5). The second mounting interface 102 may include a crossbar 130 extending between the mounting arms 114 to support the mounting arms 114 against loads that are unevenly distributed laterally. Stated another way, the mounting arms 114 may be fixed with respect to one another. In some embodiments, each of the hydraulic cylinders 118 are coupled between the chassis surface 106 and the crossbar 130, and extension and retraction of the hydraulic cylinders 118 causes movement (e.g., pivoting movement) of the crossbar 130 and the mounting arms 114 relative to the chassis surface 106.

With continued reference to FIGS. 6 and 7, the locking mechanism 122 includes a first wall 134, a second wall 138, a first locking aperture 142, and a second locking aperture 146. The first locking aperture 142 is located on the first wall 134. The second locking aperture 146 is located on the second wall 146. The first locking aperture 142 and the second locking aperture 146 have the same shape as the latch apertures 90 such that the first locking aperture 142 and the second locking aperture 146 are rectangular. In the mounted state, the latch apertures 90 align with a corresponding one of the first locking aperture 142 and the second locking aperture 146. As such, the latch apertures 90, the first locking aperture 142, and the second latch aperture 146 are configured to receiving a lock member, e.g., a lock bar or lock cylinder 150, (FIG. 13) to lock the energy storage system 14 in the mounted state. In some embodiments, the lock cylinder 150 may extend partially through the latch apertures 90, the first locking aperture 142, and the second locking aperture 146. That is, the lock cylinder 150 does not extend completely through the latch apertures 90, the first locking aperture 142, and the second locking aperture 146 such that the lock cylinder 150 wedges the energy storage system 14 to the chassis 18. In other embodiments, the lock cylinder 150 may extend completely through the latch apertures 90, the first locking aperture 142, and the second locking aperture 146.

As illustrated in FIG. 8, the locking mechanism 122 may also include wedges 154 that surround the first locking aperture 142 (FIG. 6) and the second locking aperture 146 (the wedges 154 positioned adjacent to the second locking aperture 146 are shown in FIG. 8). In the illustrated embodiment, the wedges 154 may be rectangularly shaped and may protrude from the first wall 134 (FIG. 6) and the second wall 138. In other embodiments, the wedges 154 may have different shapes or be positioned in a different manner. The wedges 154 provide a pocket 158 that is configured to receive the lock cylinder 150 to secure the energy storage system 14 (FIG. 2) in the mounted state. As such, the wedges 154 may advantageously improve the ease with which the energy storage system 14 is locked in the mounted state.

Figure 9:
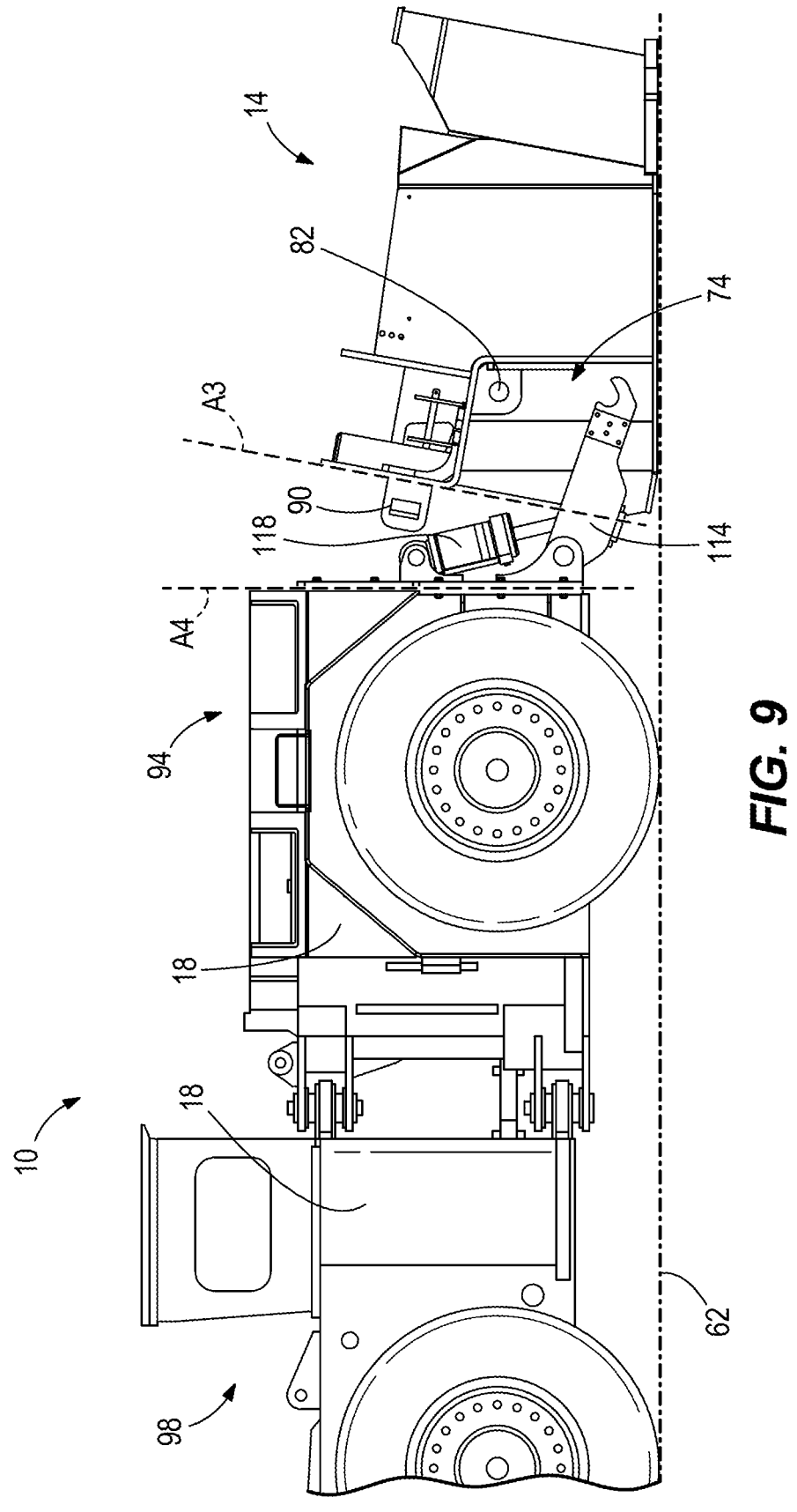
FIG. 9 is a side view illustrating a first stage of coupling the energy storage system to the electric mining machine.
Figure 10:
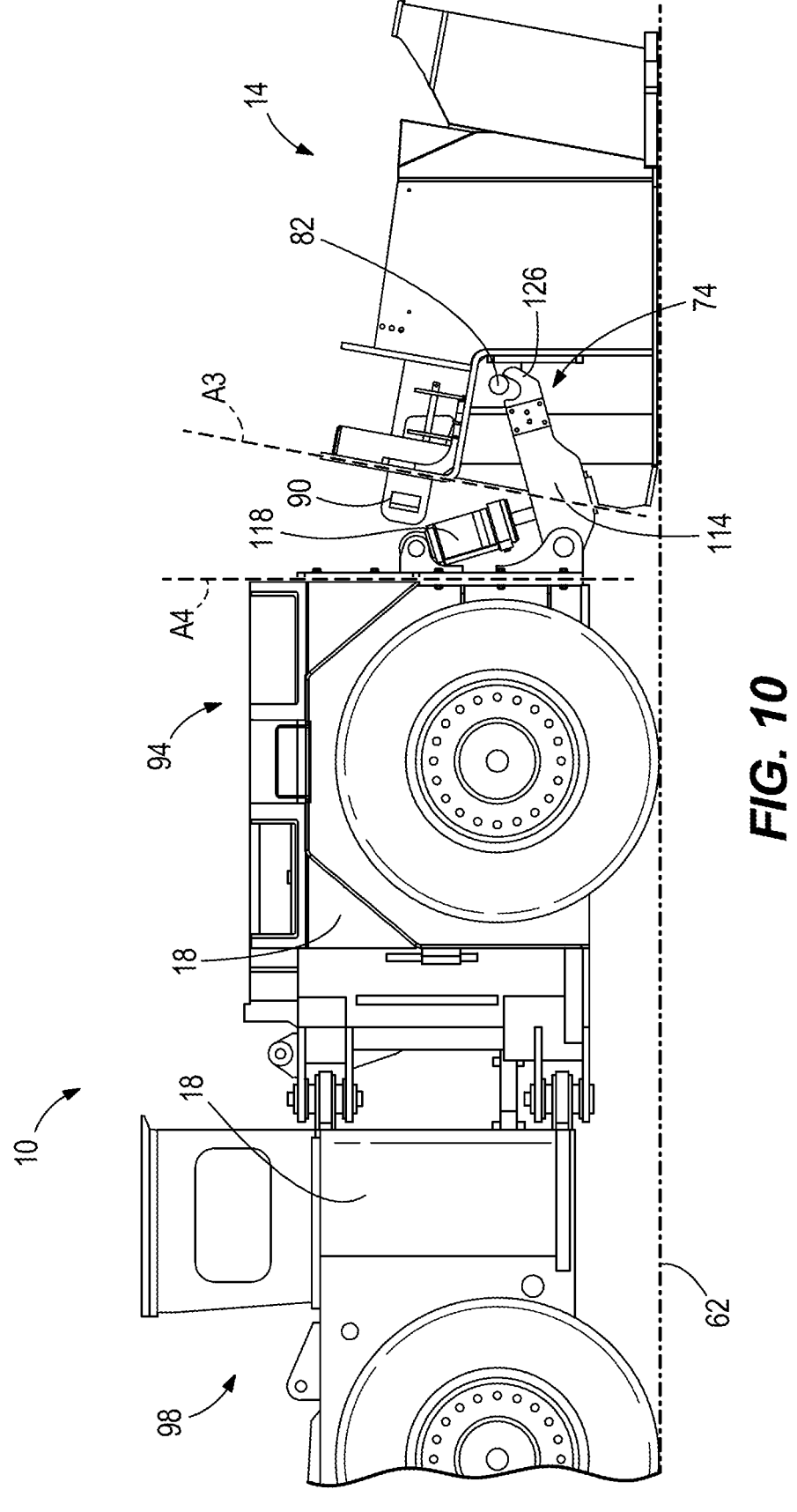
FIG. 10 is a side view illustrating a second stage of coupling the energy storage system to the electric mining machine.
Figure 11:
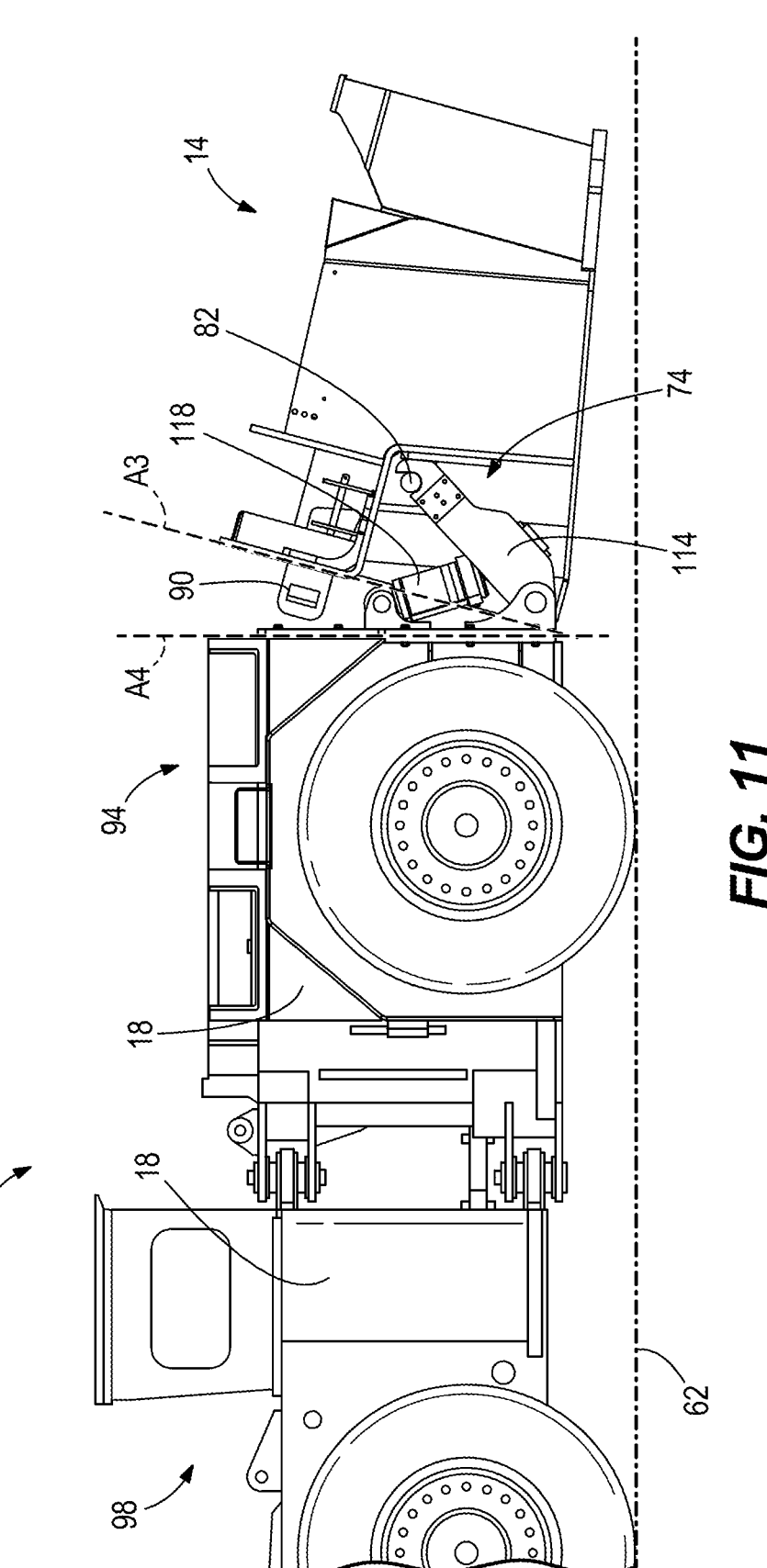
FIG. 11 is a side view illustrating a third stage of coupling the energy storage system to the electric mining machine.
Figure 12:
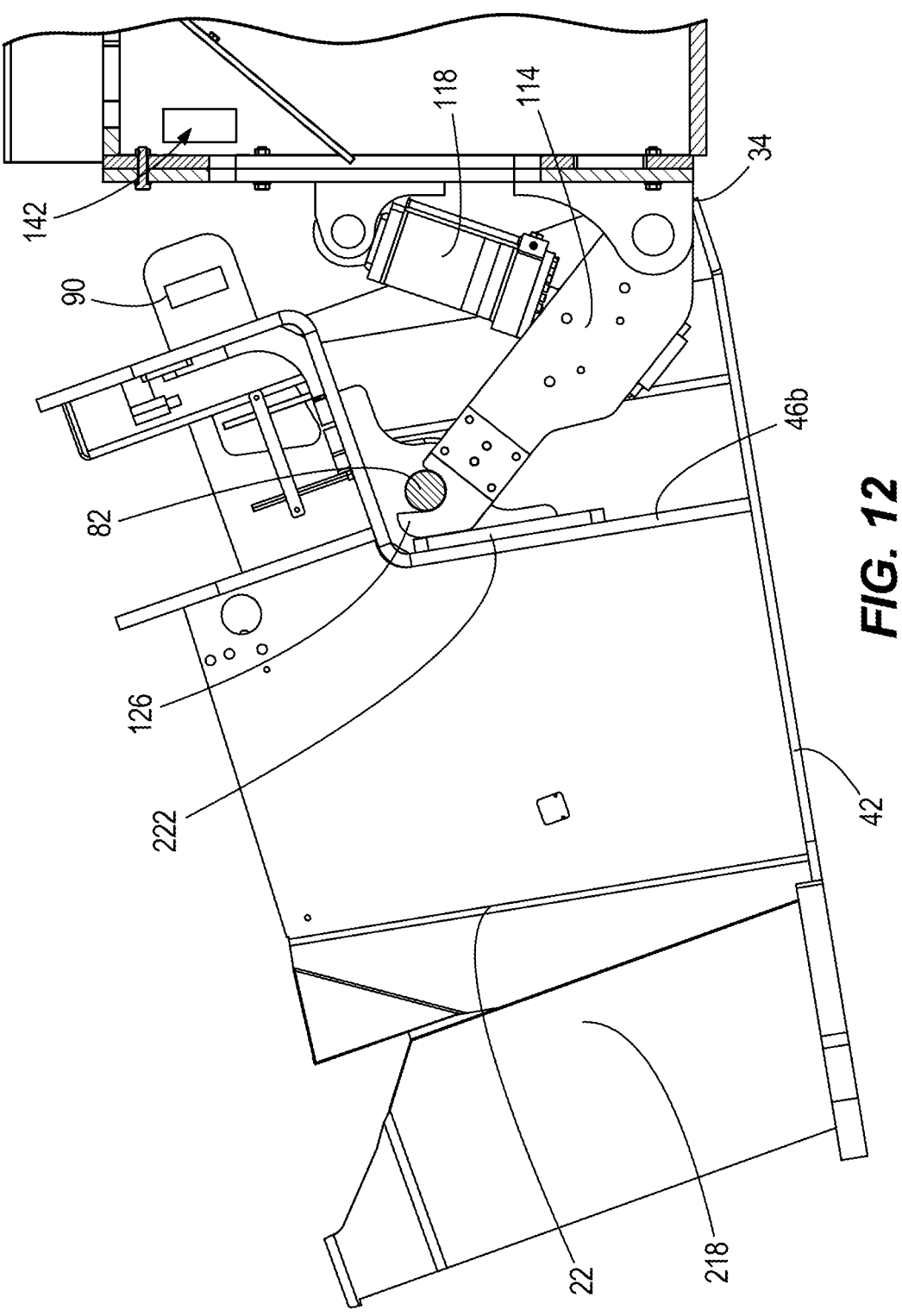
FIG. 12 is a section view of the third stage of coupling the energy storage system to the electric mining machine.

In operation, a drive system of the vehicle may be operated to position the chassis 18 such that the mounting arms 114 extend into the mounting cavity 74 of the energy storage system 14 (FIG. 9). For example, the mounting arms 114 may be inserted into the mounting cavity 74 until each of the mounting hooks 126 reaches and engages a corresponding one of the first wear plate 214 and the second wear plate 222. The hydraulic cylinders 118 can be actuated to adjust or rotate the mounting arms 114 relative to the chassis surface 106 into engagement with the mounting bar 82 of the energy storage system 14 (FIGS. 10-12). As the mounting arms 114 pivot, the wear plates 214, 222 may limit motion of the mounting hooks 126 and/or guide the mounting hooks 126 to slide along the wear plates 214, 222 until the mounting hooks 126 reach and engage the mounting bar 82. Once the mounting arms 114 are engaged with the mounting bar 82, the mounting arms 114 rotate toward the rear portion 94 of the chassis 18 to lift the energy storage system 14 off of the ground surface 62 and into the mounted state. While the mounting hooks 126 are engaged with the mounting bar 82, rotation of the mounting arms 114 also moves the energy storage system 14.

Figure 13:
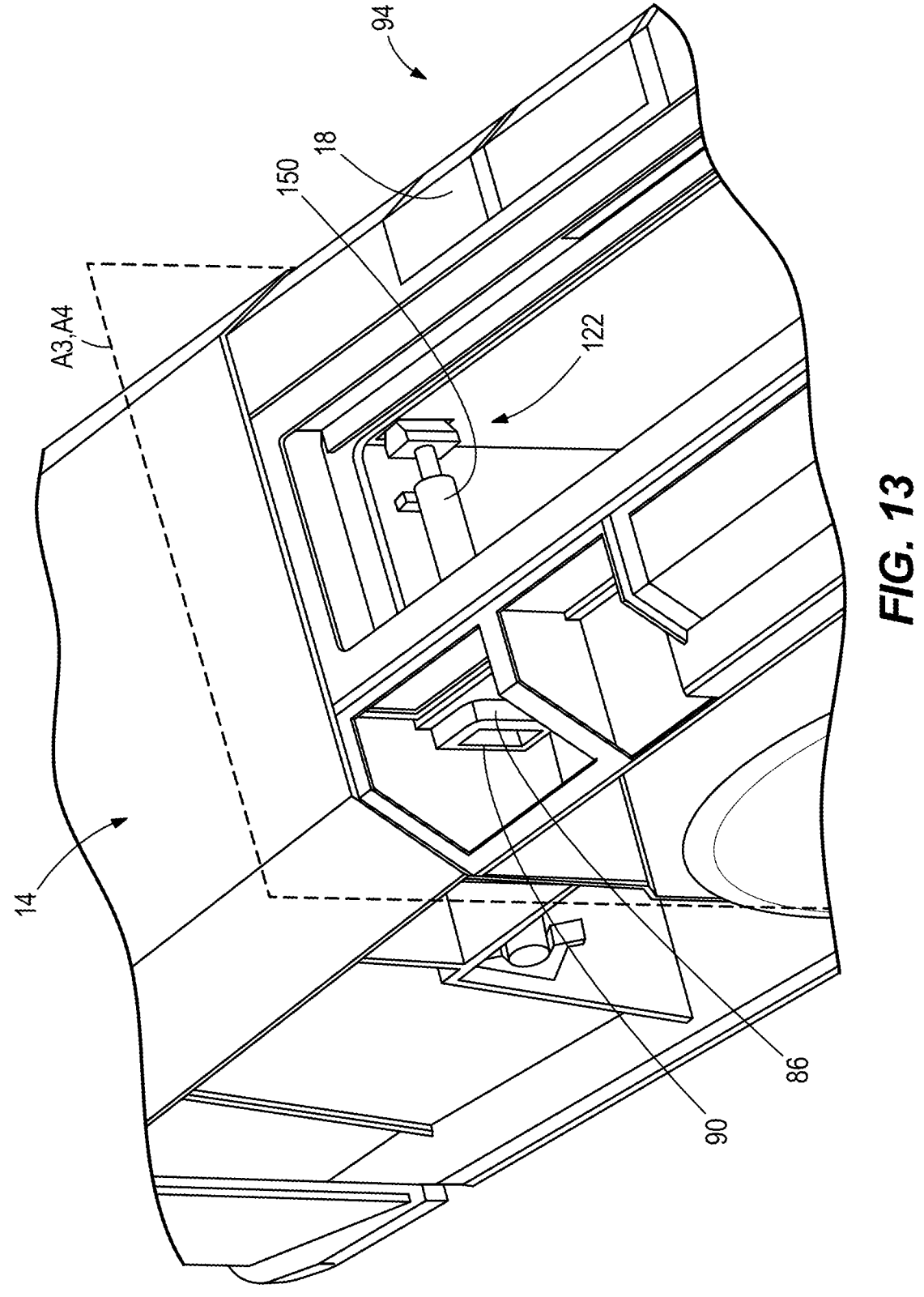
FIG. 13 is a perspective view illustrating a stage of securing the energy storage system to the electric mining machine.

As the mounting arms 114 rotate the energy storage system 14, the energy storage system 14 is moved from the idle state, in which the first mounting plane A3 is angled relative to the second mounting plane A4, to the mounted state, in which the base 42 is lifted from the ground surface 62 and the first mounting plane A3 and the second mounting plane A4 are coincident, as illustrated in FIG. 13. In the mounted state, each of the lugs 86 extends into a corresponding latch receptacle 110 (e.g., as illustrated in FIG. 7). Specifically, with reference to FIGS. 5-7, the lugs 86 extend into the latch receptacles 110 such that the latch apertures 90 are aligned with the first locking aperture 142 and the second locking aperture 146.

As illustrated in FIG. 13, once the energy storage system 14 is in the mounted state, the locking mechanism 122 can be actuated to secure the energy storage system 14 to the chassis 18. To activate the locking mechanism 122, the lock cylinder 150 may be extended through the latch apertures 90, the first locking aperture 142 (FIG. 6), and the second locking aperture 146 (FIG. 7). The lock cylinder 150 may rest between the wedges 154 in the pocket 158 (FIG. 8), the wedges 154 may support the lock cylinder 150. In some embodiments, the chassis 18 may have a control input (e.g., a switch) for extending the lock cylinder 150 through the latch apertures 90, the first locking aperture 142 (FIG. 6), and the second locking aperture 146 (FIG. 7). In some embodiments, the locking mechanism 122 may be activated automatically. For example, a sensor such as a proximity sensor may provides a signal to a controller that actuates or moves the lock cylinder 150 through the latch apertures 90, the first locking aperture 142 (FIG. 6), and the second locking aperture 146 (FIG. 7) when the sensor detects that the lugs 86 have entered the latch receptacles 110 (FIG. 6).

Figure 14:
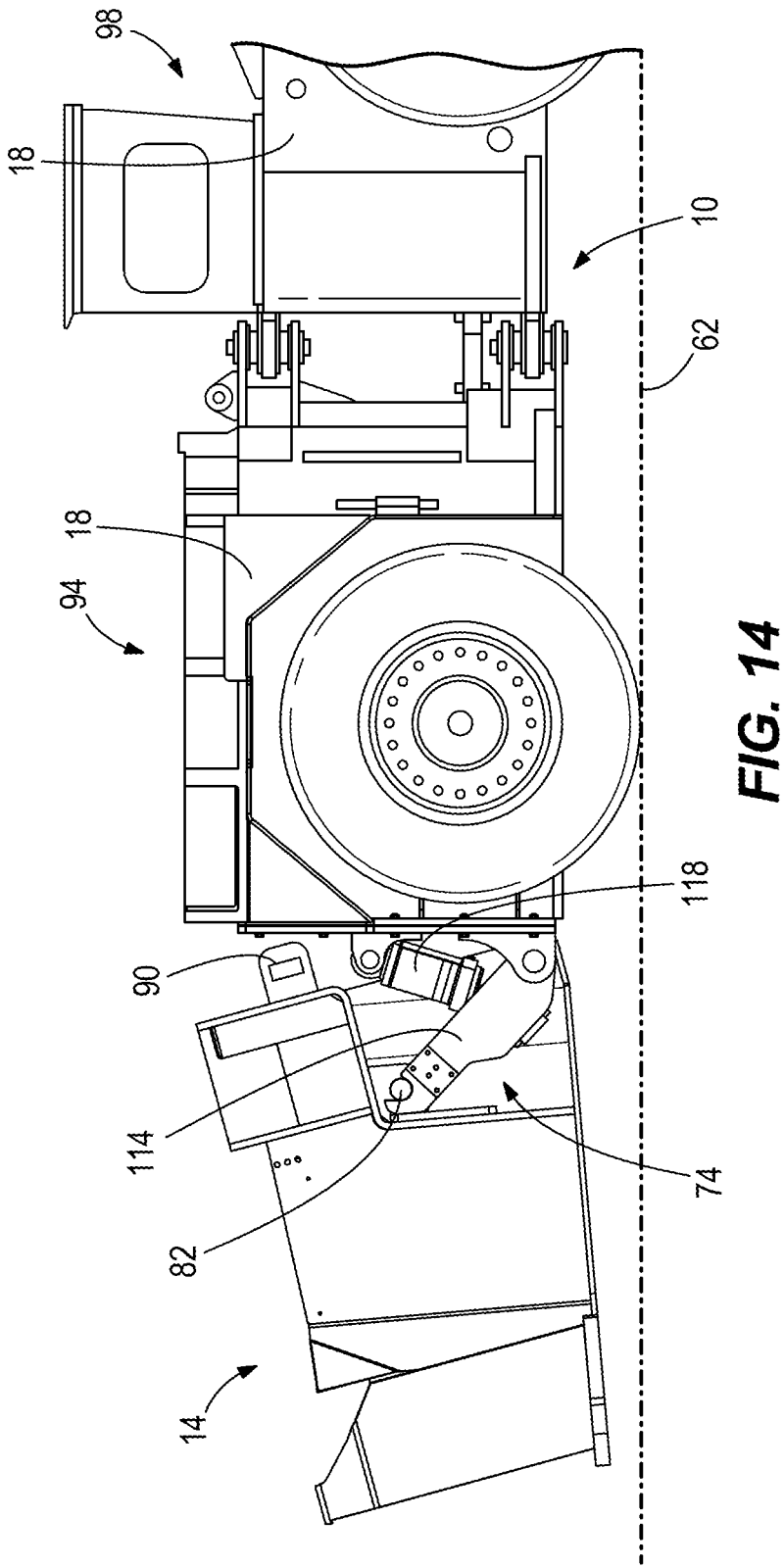
FIG. 14 is a side view illustrating a first stage during uncoupling of the energy storage system from the electric mining machine.
Figure 15:
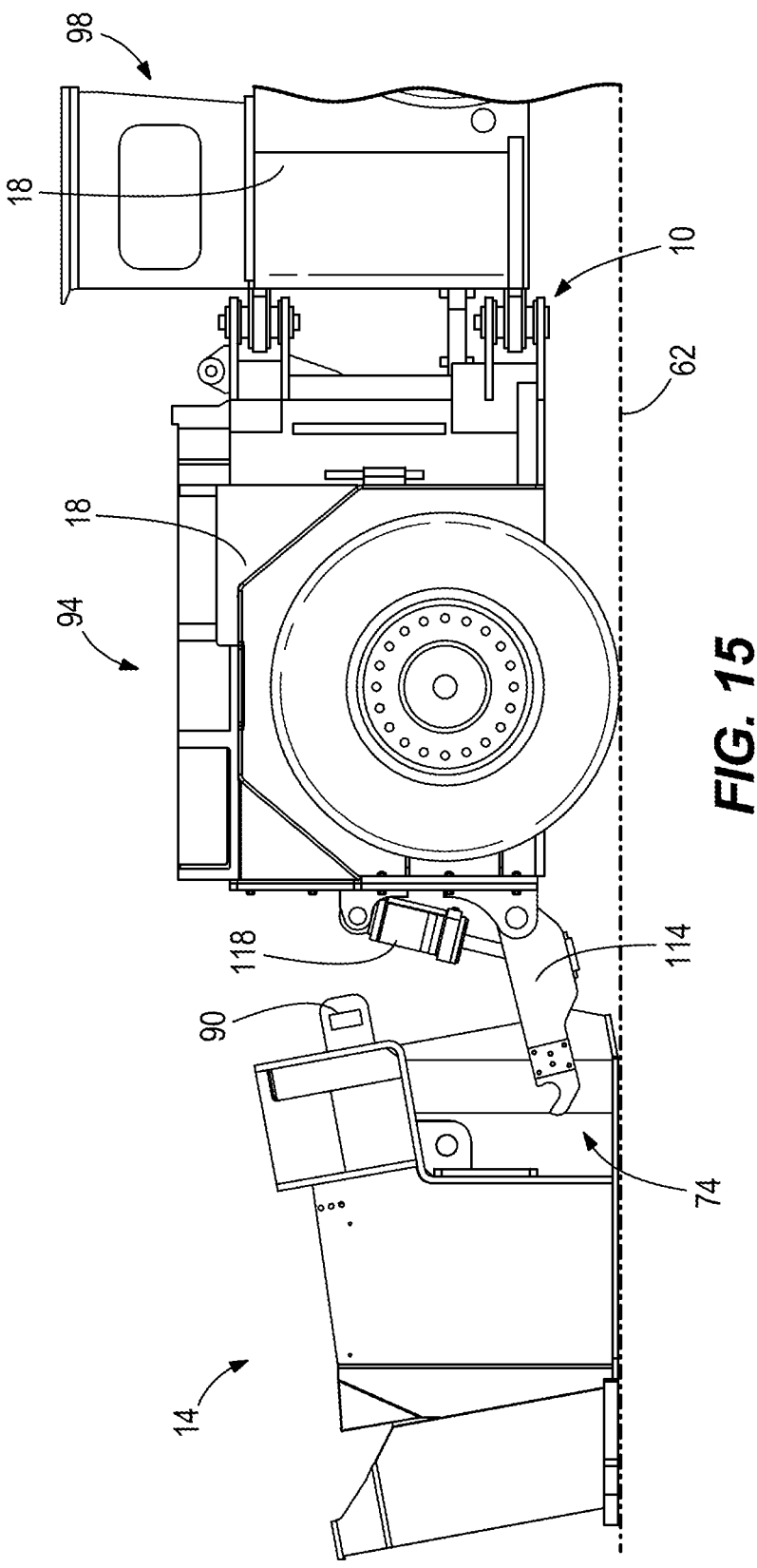
FIG. 15 is a side view illustrating a second stage during uncoupling of the energy storage system from the electric mining machine.
Figure 16:
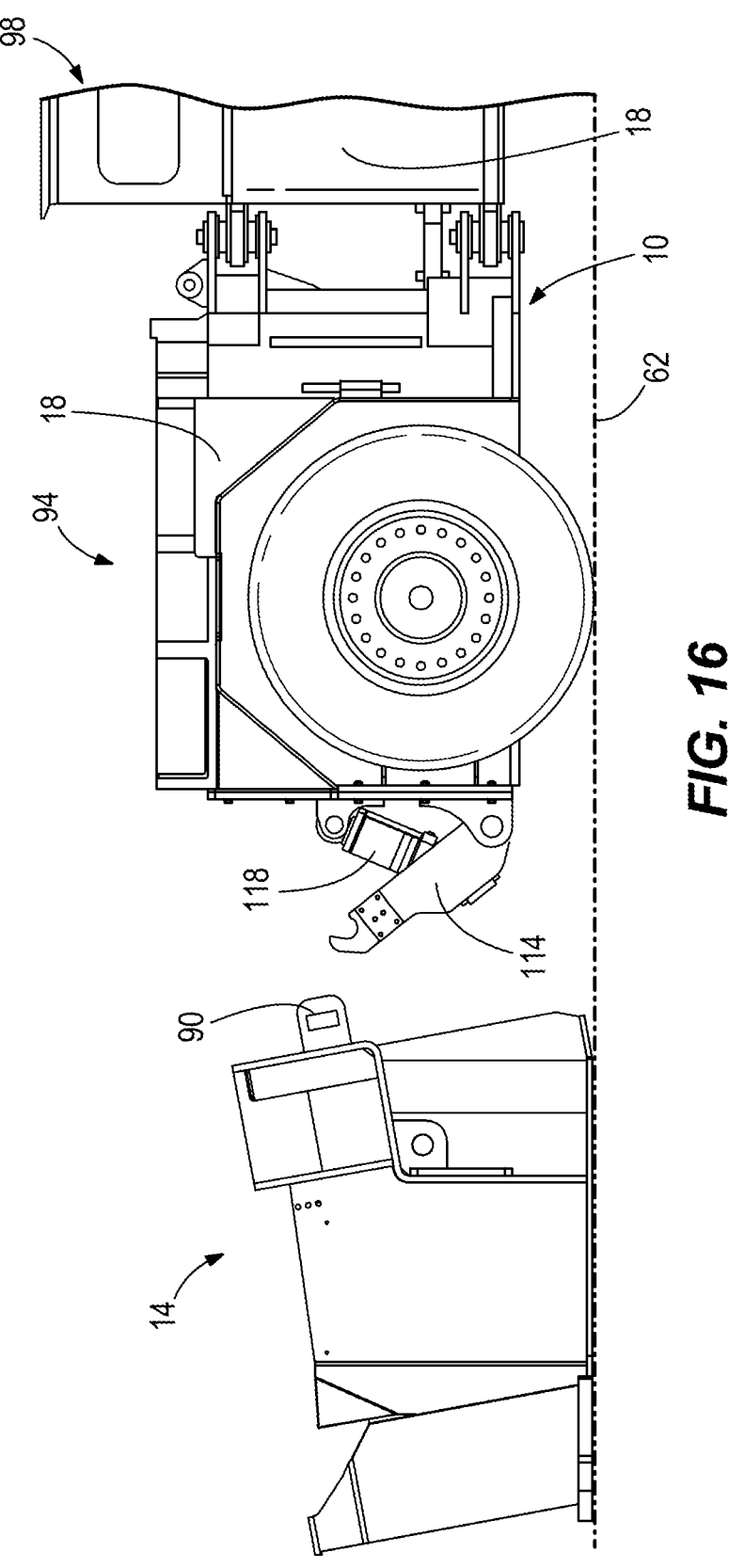
FIG. 16 is a schematic view illustrating a third stage during uncoupling of the energy storage system from the electric mining machine.

To remove the energy storage system 14 from the chassis 18, the chassis 18 is operated to position the energy storage system 14 at a desired location (e.g., on a ground surface 62). The locking mechanism 122 is deactivated, and the hydraulic cylinders 118 are actuated to rotate the mounting arms 114 away from the rear portion 94 of the chassis 18 until the base 42 of the energy storage system 14 reaches the ground surface 62. As illustrated in FIGS. 14-16, once the base 42 of the energy storage system 14 rests on the ground surface 62, the hydraulic cylinders 118 may be further actuated to disengage the mounting arms 114 from the mounting bar 82. The chassis 18 may be operated (e.g., by an auxiliary power source, such as an onboard battery) to drive away from the energy storage system 14.

In some applications, the energy storage system 14 may need to be moved without the use of the chassis 18. A machine or device may be used having hooks (not illustrated) configured to attached or coupled to the apertures 70 (FIG. 4). With the hooks attached to the apertures 70, the machine may move the energy storage system 14 to a new location (e.g., by skidding the energy storage system).

The frame 22 of the energy storage system 14 facilitates mounting the energy storage system 14 onto the chassis 18 whether the energy storage system 14 is positioned on smooth ground surfaces 62 and uneven ground surfaces 62. The frame 22 of the energy storage system 14 enables the energy storage system 14 on uneven and variable ground surfaces 62 without inhibiting or worsening the ability of the chassis 18 to mount the energy storage system 14 to the chassis 18. Therefore, the energy storage system 14 does not require a designated loading area and may be placed upon the ground surface 62 anywhere within a mine. The chassis 18 does not have to travel back and forth to a designated loading zone each time a battery change is needed, thereby reducing the total amount of time loading and unloading the energy storage system 14 takes.

Although certain aspects have been described with reference to certain examples, variations and modifications exist within the spirit and scope of one or more independent aspects. Various features and aspects are set forth in the following claims.

What is claimed is:

1. An energy storage system that is selectively mountable to a vehicle, the energy storage system comprising:
   a frame including a base surface and a mounting surface, the base surface including a first portion configured to rest on a ground surface while the frame is not mounted to the vehicle, a second portion, and a fulcrum between the first portion and the second portion, wherein the first portion of the base surface is positioned in a first plane oriented at an acute angle relative to a second plane in which the mounting surface is positioned;
   a battery supported on the frame; and
   a frame mounting interface positioned adjacent the mounting surface, the frame mounting interface configured to engage a chassis mounting interface positioned on a chassis of the vehicle,
   wherein a center of gravity of the energy storage system is positioned on a side of the fulcrum proximate the first portion of the base surface, the gravity exerted on the energy storage system biasing the first portion to contact the ground surface while the frame is resting on the ground surface,
   wherein engagement of the first portion of the base surface with an even ground surface causes the second plane and the mounting surface to be oriented at an oblique angle relative to the even ground surface and causes the frame mounting interface to be oriented upwardly, away from the even ground surface for engagement with the chassis mounting interface while the frame is not mounted on the vehicle.

2. The energy storage system of claim 1, wherein the acute angle is a first acute angle, wherein the second portion of the base surface is oriented at a second acute angle relative to the first portion.

3. The energy storage system of claim 2, wherein the second acute angle is between approximately 5 degrees and approximately 30 degrees.

4. The energy storage system of claim 2, wherein the second acute angle is approximately 10 degrees.

5. The energy storage system of claim 1, wherein the frame mounting interface includes a bar and a plurality of latches protruding from the mounting surface.

6. The energy storage system of claim 5, wherein the frame mounting interface includes a recessed portion positioned on the mounting surface, wherein the bar extends laterally across the recessed portion.

7. The energy storage system of claim 1, wherein the frame includes a bumper positioned adjacent an end of the base surface, the bumper having a greater thickness than the rest of a base of the frame, the bumper including a towing feature.

8. A system for coupling an energy storage system to a vehicle, the system comprising:
   a first mounting interface configured to be positioned on one of the energy storage system and the vehicle, the first mounting interface including a bar; and a second mounting interface configured to be positioned on the other of the energy storage system and the vehicle, the second mounting interface including a mounting surface, an arm extending outwardly from the mounting surface, and a latch member coupled to the arm, the arm is supported for pivoting movement relative to the mounting surface, the latch member configured to engage the bar, actuation of the arm causing the latch member to draw the bar and the first mounting interface against the mounting surface.

9. The system of claim 8, wherein the arm is pivotable relative to the mounting surface in an upward direction from a first position toward a second position, wherein the latch member includes a hook oriented to engage the bar as the arm pivots in the upward direction, the pivoting movement of the arm in the upward direction drawing the first mounting interface against the mounting surface.

10. The system of claim 9, wherein pivoting movement of the arm in the upward direction while the hook engages the bar lifts the energy storage system from a support surface.

11. The system of claim 8, further comprising:
    an opening positioned on the first mounting interface or the second mounting interface; and
    a lug positioned on the other of the first mounting interface and the second mounting interface, the lug received in the opening as the first mounting interface is drawn against the second mounting interface.

12. The system of claim 11, further comprising a lock actuator that is movable between a retracted position and an extended position, the lock actuator operable to selectively engage the lug, thereby securing the energy storage system against movement relative to the vehicle.

13. The system of claim 12, wherein the lug is received into the opening in an insertion direction, the lug including an aperture extending in a direction transverse to the insertion direction, the lock actuator operable to selectively engage the aperture.

14. The system of claim 12, wherein the opening is a first opening and the lug is a first lug, the system further comprising a second opening laterally spaced apart from the first opening and a second lug laterally spaced apart from the first lug and received in the second opening as the first mounting interface is drawn against the second mounting interface, wherein the lock actuator is operable to selectively engage both the first lug and the second lug.

15. The system of claim 14, wherein the lock actuator is positioned between the first opening and the second opening.

16. The system of claim 8, wherein the arm is a first arm and the latch member is a first latch member, the system further comprising a second arm laterally spaced apart from the first arm and a second latch member coupled to the second arm, the first latch member and the second latch member configured to engage the bar.

17. The system of claim 16, wherein a crossbar extends laterally between the first arm and the second arm.

18. The system of claim 8, wherein the first mounting interface is positioned on the energy storage system and the second mounting interface is positioned on the vehicle, wherein the first mounting interface is oriented at an acute angle relative to a base surface of the energy storage system on which the energy storage system is configured to rest while in an unmounted state.

19. A method of mounting an energy storage system to a vehicle, the method comprising:
    engaging a mounting feature of the energy storage system with a latching member supported on the vehicle;

rotating the latching member relative to the vehicle in a direction away from a support surface, thereby lifting the energy storage system away from the support surface, rotational movement of the latching member causing an end surface of the energy storage system to be drawn toward and against an end surface of the vehicle; and actuating a locking arm to extend through at least one lug coupled to the energy storage system, thereby securing the energy storage system against movement relative to the vehicle.

* * * * *